(12) United States Patent
Saxena et al.

(10) Patent No.: US 9,009,800 B2
(45) Date of Patent: Apr. 14, 2015

(54) SYSTEMS AND METHODS OF AUTHENTICATION IN A DISCONNECTED ENVIRONMENT

(75) Inventors: Ashutosh Saxena, Ahmedabad Gujarat (IN); Harigopal K. B. Ponnapalli, Andhra Pradesh (IN)

(73) Assignee: Infosys Limited (IN)

( * ) Notice: Subject to any disclaimer, the term of this patent is extended or adjusted under 35 U.S.C. 154(b) by 573 days.

(21) Appl. No.: 12/894,237

(22) Filed: Sep. 30, 2010

(65) Prior Publication Data

US 2011/0321144 A1  Dec. 29, 2011

(30) Foreign Application Priority Data

Jun. 24, 2010  (IN) .............................. 1784/CHE/2010

(51) Int. Cl.
*G06F 21/00* (2013.01)
*G06F 21/34* (2013.01)
*G06F 21/42* (2013.01)
*G06F 21/44* (2013.01)

(52) U.S. Cl.
CPC ................. *G06F 21/34* (2013.01); *G06F 21/42* (2013.01); *G06F 21/445* (2013.01); *G06F 2221/2117* (2013.01); *G06F 2221/2119* (2013.01)

(58) Field of Classification Search
CPC ..... H04L 63/0823; G06F 21/34; G06F 21/42; G06F 21/445; G06F 2221/2117; G06F 2221/2119

USPC ........................................................ 726/6, 10
See application file for complete search history.

(56) References Cited

U.S. PATENT DOCUMENTS

| | | | |
|---|---|---|---|
| 6,889,198 B2 * | 5/2005 | Kawan ........................ 705/14.27 |
| 2005/0125529 A1 * | 6/2005 | Brockway et al. ............ 709/224 |
| 2010/0106771 A1 * | 4/2010 | Park et al. ..................... 709/203 |
| 2010/0180328 A1 * | 7/2010 | Moas et al. ....................... 726/6 |
| 2010/0198929 A1 * | 8/2010 | Huckins ........................ 709/206 |
| 2010/0275010 A1 * | 10/2010 | Ghirardi ........................ 713/155 |

OTHER PUBLICATIONS

Chen, "Ubiquitous One-Time Password Service using the Generic Authentication Architecture", Oct. 2013, Mobile Networks & App., vol. 18, p. 738-747.*

* cited by examiner

*Primary Examiner* — Josnel Jeudy
*Assistant Examiner* — Gregory Lane
(74) *Attorney, Agent, or Firm* — Cantor Colburn LLP

(57) ABSTRACT

A communication system and method are disclosed for establishing a secure communication channel including: a server for generating and storing a first instance of a unique personalized client application associated with a first-time user on the server, a client terminal for the user to communicate with the server over a communication channel and a standalone computing device having a second instance of the unique personalized application. The user authenticates the server based on a first dynamic identifier (DI-1) generated by the first instance of the unique personalized client application and the server authenticates the user based on a second dynamic identifier (DI-2) generated by the second instance of the unique personalized client application.

20 Claims, 7 Drawing Sheets

SYSTEMS AND METHODS OF AUTHENTICATION IN A DISCONNECTED ENVIRONMENT

FIELD OF THE INVENTION

The invention relates to the field of electronic communications, and more specifically to for authentication and establishment of a secure channel between a user and a server.

BACKGROUND OF THE INVENTION

In the context of information systems, intrusion refers to any unauthorized access, or malicious use of information resources. The increasing use of remote access and web-based commerce has increased the need for convenient, cost-effective, yet strong authentication models. There are many dimensions to the types of intrusion that can take place in an information system. These include target of an attack such as windows based systems, vulnerabilities and exploits that the attack uses, payload an attack may include such as a virus that installs a Trojan horse and an attack by impersonating others. One such type of intruders is the masquerader, who use authentication of other users or servers to obtain corresponding privileges, for password attacks or for information gathering attacks. For example, social security numbers, account information after linking to counterfeit bank, credit card details, debit card details, details provided on e-commerce websites, and the like.

Phishing is an example of a social engineering attack which poses a security threat. Deception becomes a valuable component in such cases. Typically, phishers impersonate known and trusted financial institutions and organizations to access a user's personal account information, access network connections and the like. Many technological solutions have been proposed to prevent and reduce phishing attempts, each having certain claimed advantages and shortcomings. Some of the proposed solutions include using dedicated hardware solutions, one-time passwords, server-side certificates, graphical indications of security level (e.g., displaying an icon representing a padlock if the website displayed in the Internet browser is secure), client-side browser extensions (e.g., to check for typical signs of phishing, such as checking website URLs and checking the syntax of presented website pages), blacklists (e.g., maintaining lists of phishing websites locally on a client or remotely on a server).

Given enough time for attempts, it's relatively easy for unauthorized intruders to crack a static password. Unlike static passwords, a one-time password changes each time user logs in with the password being generated either by time-synchronized or counter-synchronized methods that typically requires the user to carry a small piece of hardware. While this is a strong authentication model, the drawback is that if the one-time password is passed through by the attacker and used to login within milliseconds, making even the 30-60 second time period for time synchronous tokens irrelevant.

The anti-phishing technique using browser cookies is where a website places a browser cookie on the user's computer after answering secret questions. Due to frequent roaming and cookie deletion, users get accustomed to answering secret questions. The man-in-the middle can trick the user into answering the secret questions at the phisher site and then use those questions to login to the real website. The anti-phishing technique of IP geo-location is where a website associates the user's account with the geographic location of the IP address. The man-in-the-middle proxy server is routed to a local botnet computer located in the same geographic region or ISP as the user's computer. The use of virtual keyboard as a means to prevent phishing has a drawback that user's sensitive information is stolen after it is entered through the virtual keyboard. Technological solutions to combat phishing have been proposed through the use of personal trusted devices.

Several prior methods have been developed on the lines as described above. However, these security measures are vulnerable to Man-in-the-Middle (MiTM attacks). Mitigation of these attacks requires some level of user involvement in the process. The present invention is particularly designed to prevent the man-in-the-middle attacks.

SUMMARY OF THE INVENTION

It is therefore one object of the present invention to prevent man-in-the-middle attacks using a personalized client application unique to a user.

It is another object of the present invention to provide methods and systems for mutual authentication of a user and a server.

It is yet another object of the invention to establish a secure channel of communication between a user and a server According to one embodiment of the present invention, a system and method are disclosed for establishing a secure communication channel, said system and method comprising: registration of a first-time user at a remote server, wherein said remote server generates and stores a first instance of a unique personalized client application associated with said first-time user on the remote server, said first-time user installs a second instance of said unique personalized client application on a standalone computing device; authentication of said remote sever by said user, wherein said second instance of said unique personalized client application authenticates said remote server based on a first dynamic identifier (DI-1) generated by said first instance of said unique personalized client application; and authentication of said user by said remote server, wherein said first instance of said unique personalized client application authenticates said user based on a second dynamic identifier (DI-2) generated by said second instance of said unique personalized client application.

In another aspect of the present invention, system and method is disclosed for confirming the validity of a remote server to a user, said system and method comprising: registration of a first-time user at a remote server, wherein said remote server generates and stores a first instance of a unique personalized client application associated with said first-time user on the remote server, said first-time user installs a second instance of said unique personalized client application on a standalone computing device; and authentication of said remote sever by said user, wherein said second instance of said unique personalized client application authenticates said remote server based on a dynamic identifier (DI) generated by said first instance of said unique personalized client application.

In yet another embodiment of the present invention, a system and method are disclosed for authentication of a user by a remote server, said system and method comprising: registration of a first-time user at a remote server, wherein said remote server generates and stores a first instance of a unique personalized client application associated with said first-time user on the remote server, said first-time user installs a second instance of said unique personalized client application on a standalone computing device; and authentication of said user by said remote server, wherein said first instance of said unique personalized client application authenticates said user based on a dynamic identifier (DI) generated by said second instance of said unique personalized client application.

The above as well as additional objectives, features, and advantages of the present invention will become apparent in the following detailed written description.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

The exemplification set out herein illustrates an embodiment of the invention, in one form, and such exemplifications are not to be construed as limiting the scope of the invention in any manner.

DETAILED DESCRIPTION OF THE INVENTION

The present invention uses both, static and dynamic approach to mutually authenticate the entities involved, using a third device unconnected to the network. Static credentials and dynamic identifiers (DI) are used to authenticate both, a server and a user using a client personalized application (hereinafter referred to as CPA) unique to a user. The resulting two-way authentication in a disconnected environment can help secure interactions and e-commerce transactions from any fraudulent activity. For example, the present invention allows for authentication types such as webpage authentication, authentications for network access, authentication for carrying out transactions between a buyer and a seller. Further, this disconnected authentication system ensures an establishment of a secure connection before a user provides any sensitive information. The present invention also allows a server operating as a merchant to verify the identity of a user before carrying out any transaction. One skilled in the art will appreciate that the terms user, client, customer, buyer, party and merchant are used to mean the same.

Figure 1:
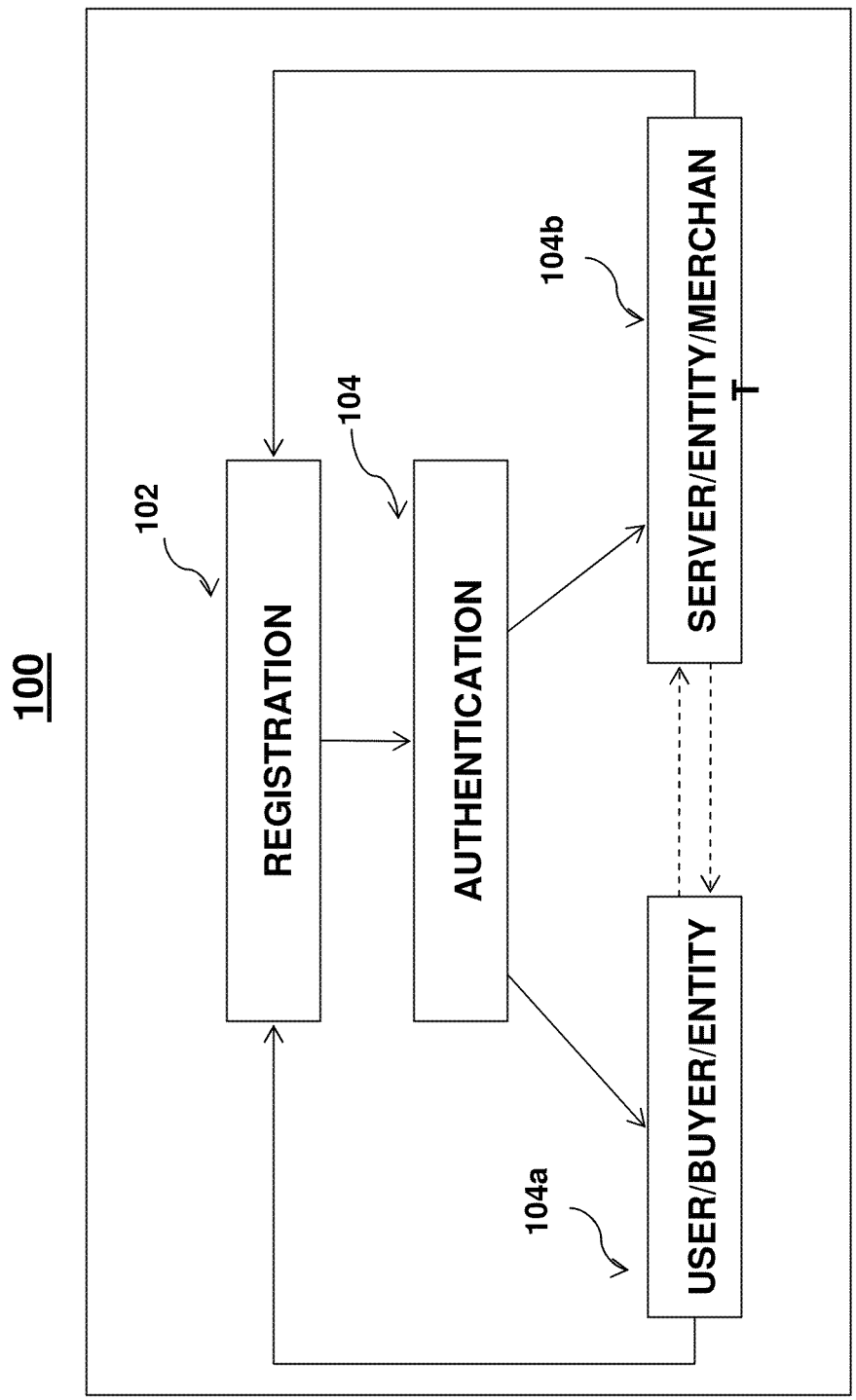
FIG. 1 is a block diagram depicting an operation of the present invention relating to authentication of user and/or server using the method of the present invention.
Figure 2:
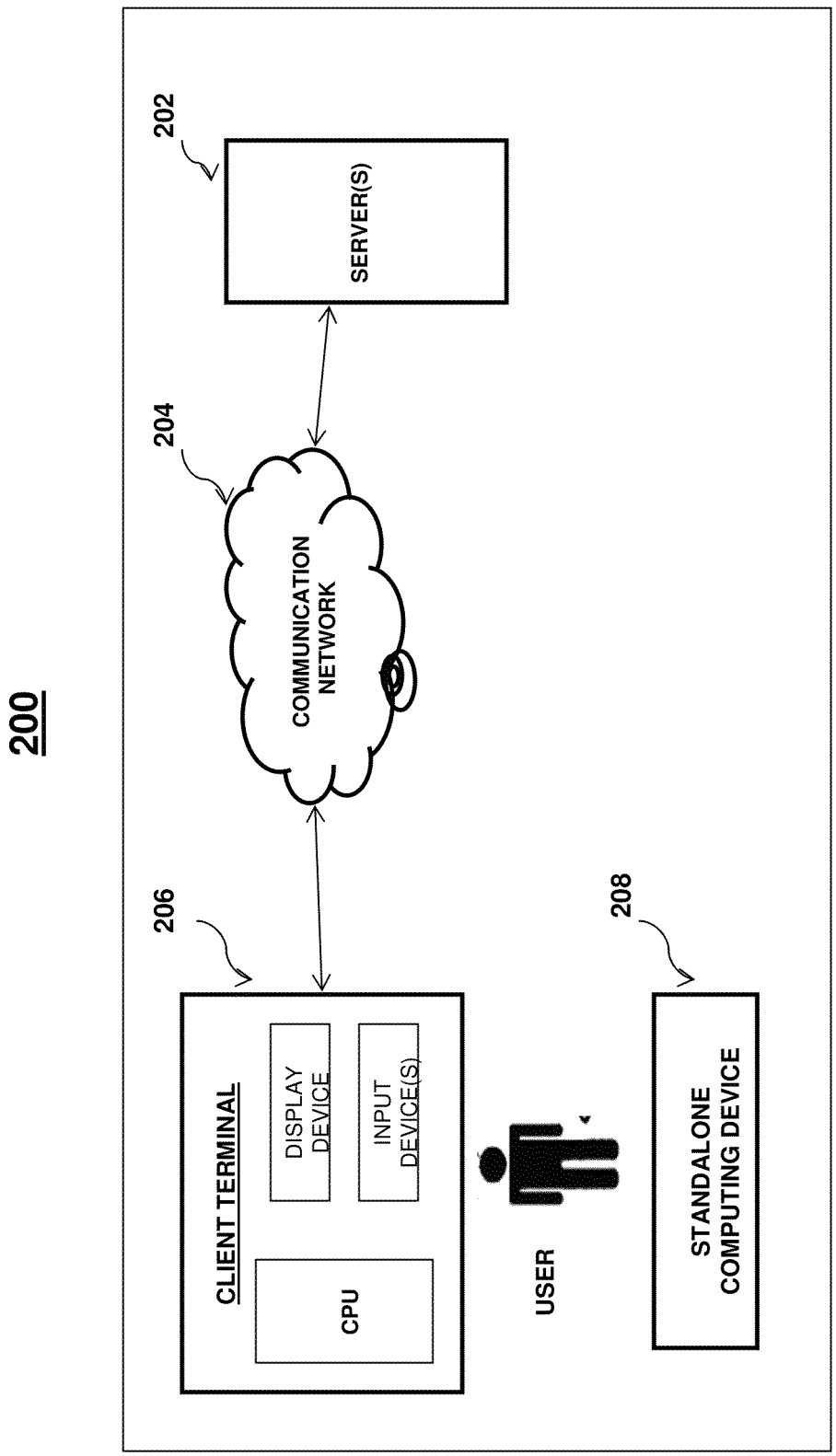
FIG. 2 is a block diagram illustrating a communication system for establishing a secure channel between a user and a server according to one embodiment of the present invention.
Figure 3:
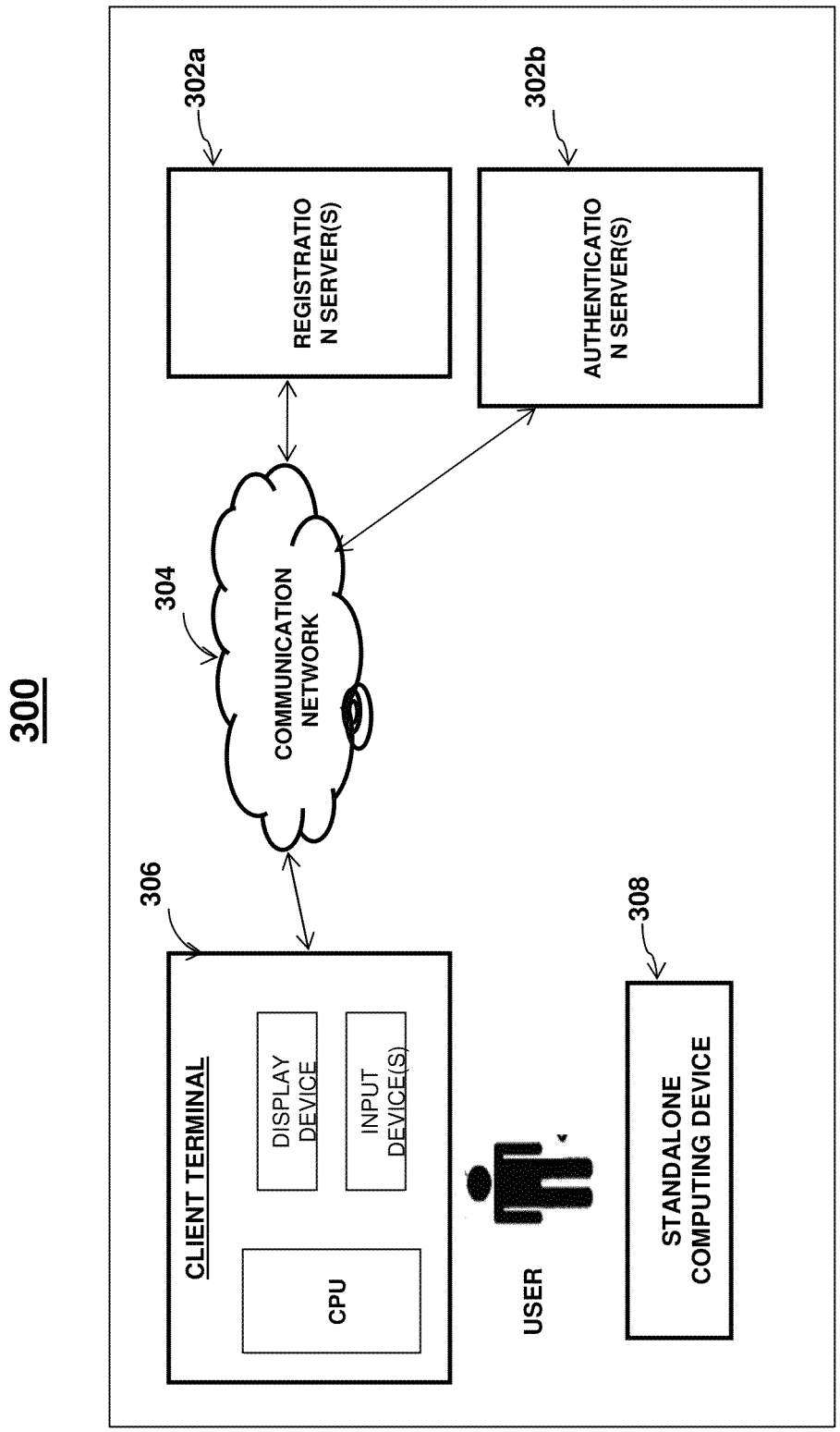
FIG. 3 is a block diagram illustrating an alternate communication system for establishing a secure channel between a user and a server according to one embodiment of the present invention.

FIG. 1 is a flow diagram illustrates an overview of the series of operations 100, performed by an authentication system in a disconnected environment in accordance with an exemplary embodiment of the present invention. The series of operations, 100 is composed of two parts, namely, the registration phase and the authentication phase. The use of the authentication system in a disconnected environment as illustrated in FIG. 2 and FIG. 3 requires registration 102 to be effective. The registration phase is performed only once, whenever a new user wants to register the system and the authentication phase is executed every time the user logs into the system. Operation 102 is performed in accordance with FIG. 4. Operation 104 is performed in accordance with FIG. 5, FIG. 6 or FIG. 7, depending upon the embodiment. Operations 104 and 106 can be performed interchangeably, depending on the embodiment. Additional, fewer, or different operations may be performed in alternative embodiments.

The authentication systems 200, 300 in a disconnected environment, illustrated by way of FIG. 2 and FIG. 3 can be incorporated into a network server, implemented as a combination of servers and/or implemented on a standalone server. In an operation 102, a client initiates a session with a server using a client terminal 206, 306 coupled to a communication network 204,304. The server can be one or more 202, 302a. The client terminal 206, 306 is computing device that supports TCP/IP or other conventional communication protocols. The client terminal can be a desktop computer, laptop computer, cellular phone, personal digital assistant (PDA), or any other device capable of communicating across a network 204,304. The communication network can be the internet or any other network in which communication can be performed.

Further, in operation 102, illustrated by FIG. 4, the server 202, 302a creates and stores a first instance of a client personalized application (hereinafter referred to as CPA) unique to the client performing the operation. The client installs a second instance of the CPA on a standalone computing device 208, 308. The standalone computing device can be a desktop computer, laptop computer, a personal trusted device such as a cellular phone, personal digital assistant (PDA), or any other device capable of computing and not connected to the network. As discussed earlier, the use of the authentication system in a disconnected environment as illustrated in FIG. 2 and FIG. 3 requires registration 102 to be effective.

Figure 4:
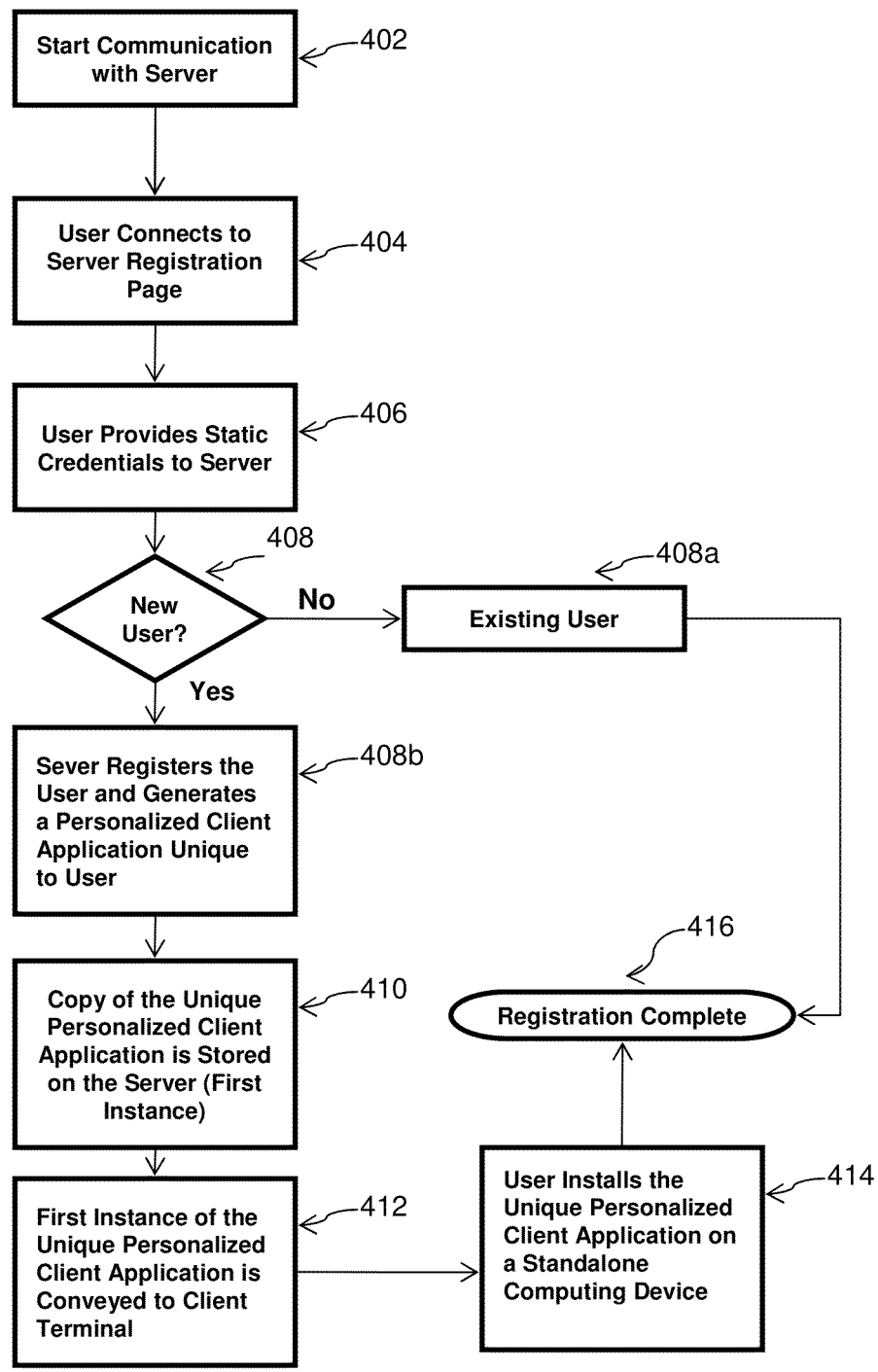
FIG. 4 is a flow-diagram illustrating the registration of a first-time user with a server using the method of the present invention.

FIG. 4 is a flow diagram illustrating the implementation of operation 102. This registration is performed once and all future communications can be authenticated as described herein. If the client is registered with the server, he or she can verify the authenticity of the server in future, thus allowing him to verify the webpage he is accessing. The registration further allows the server to verify the identity of the client before any task or transaction is initiated. When a user initiates a session 402 with the server operating a webpage, he or she is directed to a registration page 404. User submits his or her static credentials 406. The term static credentials in accordance with the present invention means any combination of character(s), symbol(s), sound(s), image(s), numeral(s), biometric(s) by which the user is able to identify himself to the server(s) 202, 302a, 302b. The static credential(s) can be entered by the user using the client terminal 206, 306 through any method known to those skilled in the art. For example, the user can enter the user identification through a keyboard, a virtual keyboard, a touch screen, biometric recognition software etc. Further, the static credentials required by the server should preferably exclude any information which is easily obtainable by a third person. The received credentials are verified by the server to determine whether it is an active account or a valid new user account 408. Registration of the user is denied 408a by the server if the static credentials are that of an active account. Once the user is registered with the server, the server(s) 202, 302a generates a CPA unique to the registered user, based on the static credentials and unique seed value of the user. Those persons skilled in the art of authentication systems will be aware of registration with user credentials and unique seed value. The server 202, 302a creates a first instance of the CPA 410 on the server and propagates a copy of the CPA 414 to the user terminal 206, 306.

As discussed above, the server(s) 202, 302a generates a CPA unique to every user who registers for the first-time and a first and a second instance of the CPA is installed on the server and a standalone computing device 208, 310 respectively. Thus, the possibility of man-in-the-middle attacks is reduced to a minimum. In an operation 104, both user and/or server can authenticate each other, depending on the embodiment.

Figure 5:
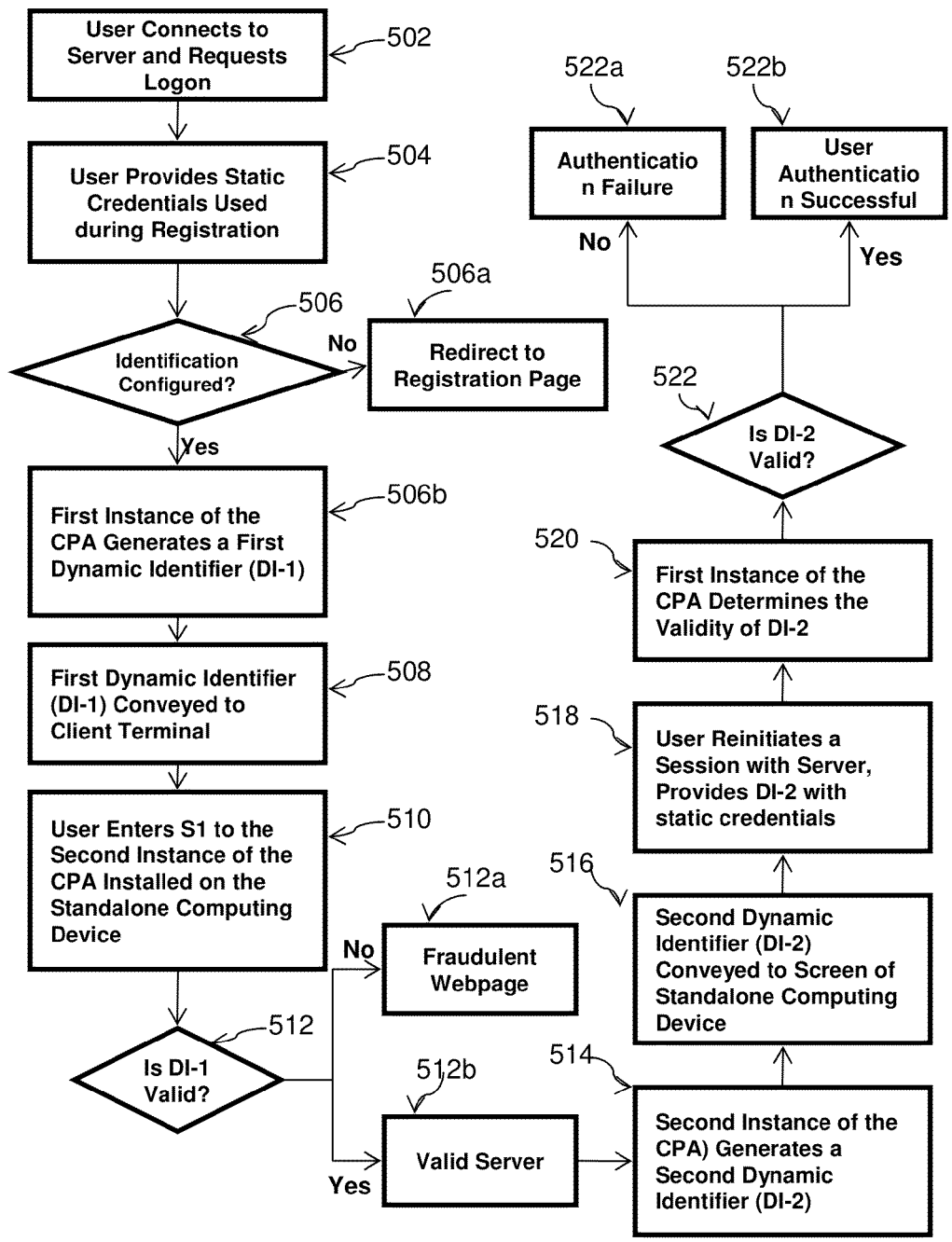
FIG. 5 is a flow-diagram illustrating a method of mutual authentication according to the present invention.

FIG. 5. is a flow diagram illustrating the steps of mutual authentication of a user and a server. For purposes of authentication, when a user initiates a session 502 with the server operating a webpage, he or she is directed to a logon page 504 to key-in their static credentials which were provided by the user to the server(s) 202, 302a at the time of registration. The server(s) 202, 302a, 302b can determine, based on the received credentials, whether the user is enrolled 506 in the disconnected mutual authentication system. If the user is not enrolled with the server, the user is redirected to the registration page 506a and is required to enroll himself as illustrated in FIG. 4. If the user is found to be enrolled with the server, the first instance of the CPA generates a first dynamic identifier (hereinafter referred to as DI-1) 506b. The first instance of the CPA uses a cryptographic one time password algorithm like OTHP or similar approach to compute the dynamic identifier (DI-1). Person skilled in the art are familiar with these algorithms and approaches. For example, RFC 4226 is document by the Network Working Group providing information on one-time password algorithm. The algorithm is event-based and can be easily implemented by a software developer. The term dynamic identifier (DI) is used to mean generation of strings formed from a combination of character(s), symbol (s), and/or numeral(s), such string generated for each instance of access by the user on the server for the webpage managed by the server. The validity of this dynamic identifier (DI-1) can be for a time span configured by the server. The dynamic identifier (DI-1) is conveyed to the client terminal 508 and adapted for by the user for verifying the authenticity of the server managing the webpage. The user reads this dynamic identifier (DI-1) displayed on the client terminal 206, 306 and enters the dynamic identifier (DI-1) to the second instance of the CPA 510 installed on the standalone computing device 208, 308. The dynamic identifier (DI-1) received by second instance of the CPA is used to determine the authenticity of the webpage by cryptographic means. A message is displayed on the display screen of the standalone computing device to indicate the authenticity of the webpage 512a, 512b to the user. The authentication process is terminated if the second instance of the CPA does not validate the dynamic identifier (DI-1). The second instance of the CPA generates a second dynamic identifier (hereinafter referred to as DI-2) 514 if the dynamic string (DI-1) is successfully authenticated of the second instance of the CPA. The second instance of the CPA uses a cryptographic one time password algorithm like OTHP or similar approach, to compute the dynamic identifier (DI-2). For example, RFC 4226 is document by the Network Working Group providing information on one-time password algorithm. The algorithm is event-based and can be easily implemented by a software developer. The second dynamic identifier (DI-2) is conveyed to the client terminal 516.

After the validation of the server by the user, the user can alternatively enter his static credentials into the second instance of the CPA, following which the second instance of the CPA generates a second dynamic identifier (DI-2) and displays it on the screen of the standalone computing device 516.

Next, the user reinitiates the session with the server(s) 202, 302a, 302b, reenters the static credentials along with the second dynamic identifier (DI-2) 518. The server(s) 202, 302a, 302b can determine the time span when the dynamic identifier (DI-1) was provided by the server to the user and the time span when the second dynamic identifier (DI-2) is being provided to the server for authentication, and, can accordingly accept or reject the second dynamic identifier (DI-2). The second dynamic identifier (DI-2) is adapted for verification by the server, if provided by the server to the user within the stipulated time interval, using the first instance of the CPA. A message is displayed on the display screen of the client terminal to indicate the authenticity of the user to the server 522a, 522b. The authentication process is terminated if the first instance of the CPA does not validate the dynamic identifier (DI-1).

In another embodiment, a buyer can be authenticated by a merchant using the system and methods of the present invention, before the transaction process is initiated between such buyer and such merchant. The use of this authentication system in a disconnected environment as requires registration, as illustrated in FIG. 4 to be effective. This registration is performed once and all future communications can be authenticated as described herein. The registration allows the merchant to verify the identity of the buyer before any transaction is initiated.

Figure 6:
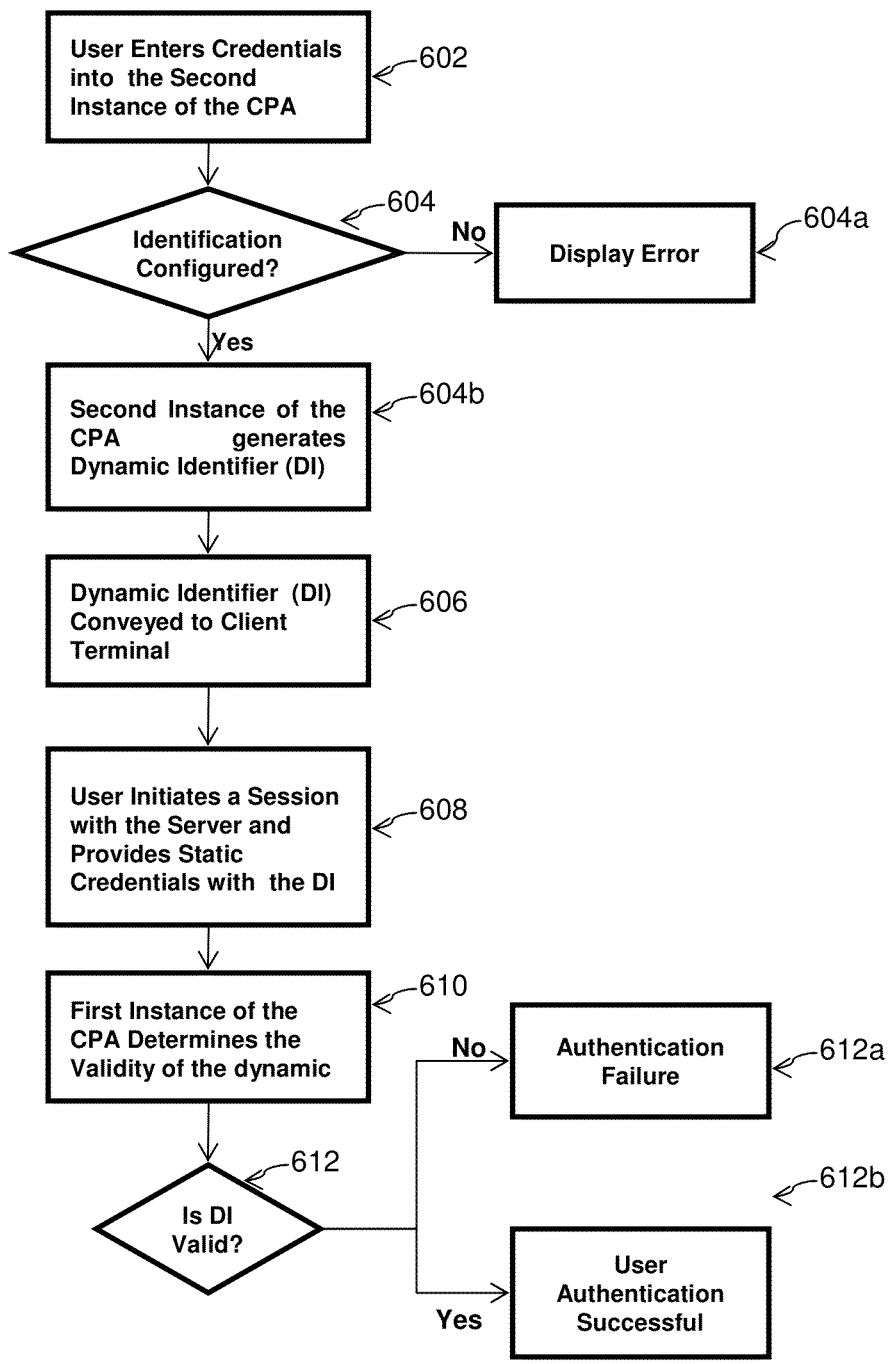
FIG. 6 is a flow-diagram illustrating a method for verifying the identity of a user by a server using the method of the present invention.

FIG. 6 is a flow diagram illustrating the method of authentication of a buyer by a merchant. Through the standalone computing device 208, 308, the buyer provides his static credentials to the second instance of the CPA 602. The second instance of the CPA can determine 604 whether it is an active account or an invalid account. An error message 604a is displayed on the screen of the standalone computing device if it is determined by the second instance of the CPA that such application is not based on the static credentials of the buyer, thus, an invalid authentication process will be terminated. Upon verification of the identity of the buyer, the second instance of the CPA computes a dynamic identifier (DI) 604b using cryptographic algorithm. The dynamic identifier (DI) is conveyed to the screen of the standalone computing device 606. The buyer, through the client terminal 206, 306 seeks to connect to the server(s) 202, 302a, 302b hosted by the merchant. The buyer is redirected to a logon page where he provides his static credentials along with the dynamic identifier (DI) 608. The first instance of the CPA validates the dynamic identifier (DI) 610 using cryptographic algorithms. A message is displayed on the display screen of the client terminal 612a, 612b to indicate the authenticity of the buyer to the merchant. The authentication process is terminated if the first instance of the CPA does not validate the dynamic identifier (DI).

In another embodiment, a buyer can verify the authenticity of a webpage hosted by a merchant using the system and methods of the present invention, before the transaction process is initiated between such buyer and such merchant. The use of this authentication system in a disconnected environment as requires registration, as illustrated in FIG. 4 to be effective. This registration is performed once and all future communications can be authenticated as described herein. The registration allows the merchant to verify the identity of the buyer before any transaction is initiated.

Figure 7:
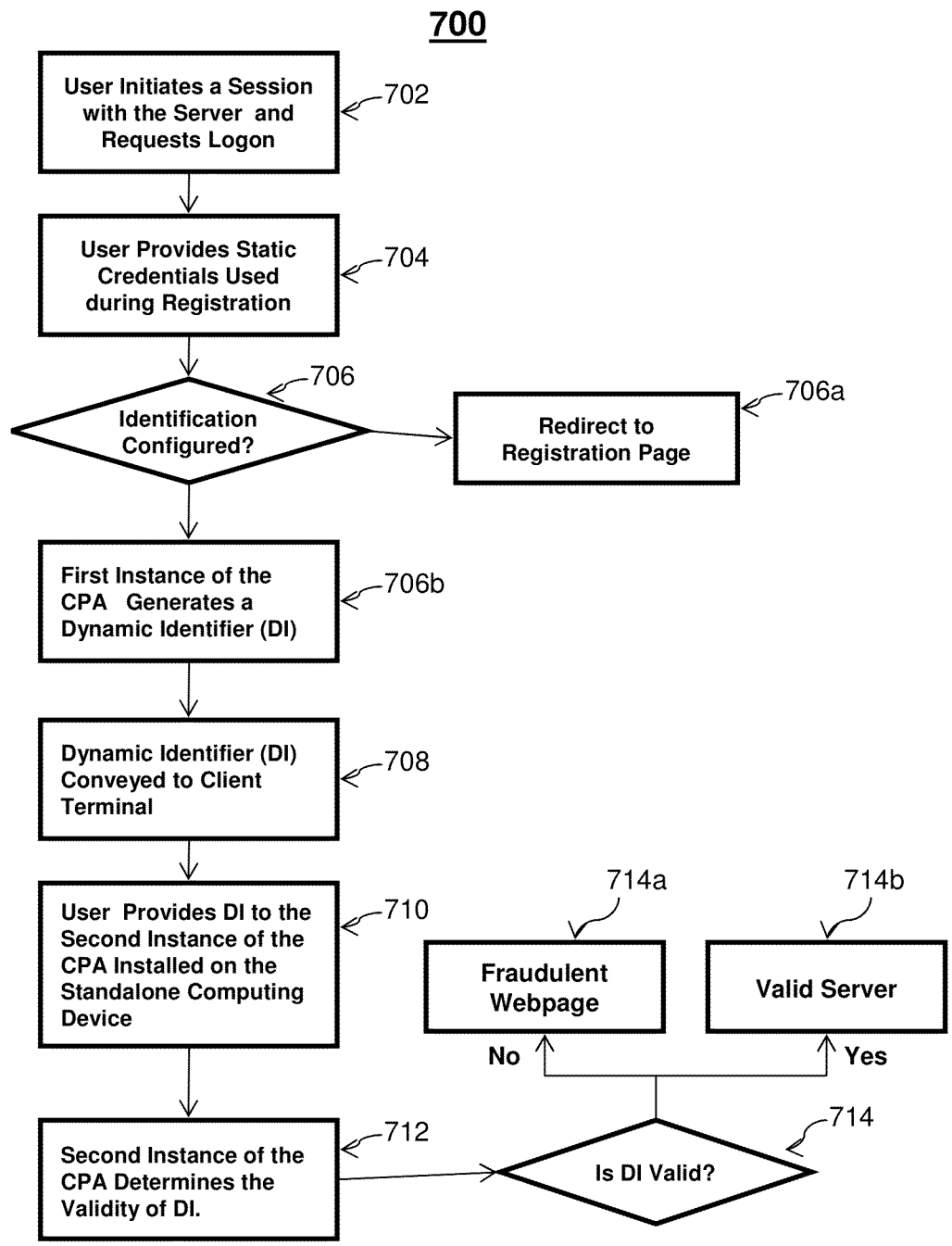
FIG. 7 is a flow-diagram illustrating a method for determining the authenticity of a server by a user using the method of the present invention.

FIG. 7 is a flow diagram illustrating the method by which a buyer can validate the authenticity of a webpage hosted by a merchant. Through the client terminal 206, 306, buyer seeks to connect to the server(s) 202, 302a, 302b of the merchant, through the network 204, 304, in order to submit his or her static credentials to the server. The server can determine 706 whether it is an active account or an invalid account. If the buyer is not enrolled with the server, the buyer is redirected 706a to the registration page and is required to enroll in operation 102 as illustrated in FIG. 4. If the buyer is found to be enrolled with the server, the first instance of the CPA generates a dynamic identifier (DI) 706b. The first instance of the CPA uses a cryptographic algorithm to compute the dynamic identifier (DI). The validity of this dynamic identifier (DI) can be for a time span configured by the server. The dynamic identifier (DI) is conveyed to the client terminal 708 and adapted by the buyer for verifying the authenticity of the server managing the webpage. The buyer reads this dynamic identifier (DI) displayed on the client terminal 206, 306 and provides this dynamic identifier (DI) to the second instance of the CPA 710 installed on the standalone computing device 208, 308. The dynamic identifier (DI) received by second instance of the CPA is used determine the authenticity of the webpage by cryptographic means. A message is displayed on the display screen of the standalone computing device to indicate the authenticity of the webpage 714a, 714b2 to the user. The authentication process is terminated if the second instance of the CPA does not validate the dynamic identifier (DI).

The Figures (FIGS.) in the description relate to preferred embodiments of the present invention by way of illustration only. One skilled in the art may appreciate that alternative embodiments of the systems and methods disclosed herein will be readily recognized as viable alternatives that may be employed without departing from the principles of the claimed invention.

What is claimed is:

1. A method for establishing a secure communication channel between a server and a client terminal across a communication network, said method comprising:
   registration of a first-time user at the server, wherein said server generates and stores a first instance of a unique personalized client application associated with said first-time user on the server, said first-time user installs a second instance of said unique personalized client application on a standalone computing device, wherein said standalone computing device is prevented from direct and indirect network based data communication with the server and with the client terminal;
   transmitting a first dynamic identifier (DI-1) generated by the first instance of the unique personalized client application stored at the server, from the server to the client terminal over the communication network;
   determining authenticity of said server, wherein the second instance of said unique personalized client application installed at the standalone computing device determines authenticity of said server based on the first dynamic identifier (DI-1) received at the client terminal;
   generating using the second instance of the unique personalized client application installed at the standalone computing device, a second dynamic identifier (DI-2);
   responsive to authentication of the server by the second instance of the unique personalized client application at the standalone computing device, transmitting the second dynamic identifier (DI-2) from the client terminal to the server over the communication network; and
   authentication of said user by said server, wherein said first instance of said unique personalized client application stored at the server authenticates said user based on the second dynamic identifier (DI-2) generated by said second instance of said unique personalized client application installed at the standalone computing device.

2. The method as recited in claim 1, wherein said server includes a registration server or an authentication server or both.

3. The method as recited in claim 1, wherein registration at said server is initiated in response to submission of static credentials by said user using a client terminal to said server over the communication channel.

4. The method as recited in claim 3, wherein said first instance of said unique personalized client application is conveyed over the communication channel to said client terminal.

5. The method as recited in claim 3, wherein said first dynamic identifier (DI-1) is generated by the said server in response to submission of said static credentials to said server.

6. The method as recited in claim 3, wherein said second dynamic identifier (DI-2) is generated in response to submission of said static credentials to said second instance of said unique personalized client application.

7. The method as recited in claim 1, wherein said standalone computing device is selected from at least of a desktop computer system or a laptop computer system or a cellular telephone or a personal digital assistant (PDA) or a radio identification system (RFID) and a gadget capable of storing and processing data or combinations thereof.

8. A system for establishing for establishing a secure communication channel between a server and a client terminal across a communication network, said system comprising:
   a server for generating and storing a first instance of a unique personalized client application associated with a first-time user on said server;
   a client terminal for a user to communicate with said server over a communication channel; and
   a standalone computing device prevented from direct and indirect network based data communication with the server and with the client terminal, and comprising a second instance of said unique personalized application, said personalized client applications installed by said first-time user,
   wherein:
   a first dynamic identifier (DI-1) is generated by the first instance of the unique personalized client application stored at the server, which first dynamic identifier (DI-1) is transmitted from the server to the client terminal over the communication network,
   the second instance of the unique personalized client application installed at the standalone computing device determines authenticity of said server based on the first dynamic identifier (DI-1) received at the client terminal;
   a second dynamic identifier (DI-2) is generated using the second instance of the unique personalized client application installed at the standalone computing device;
   responsive to authentication of the server by the second instance of the unique personalized client application at the standalone computing device, the second dynamic identifier (DI-2) is transmitted from the client terminal to the server over the communication network;
   said first instance of said unique personalized client application stored at said server authenticates said user based on the second dynamic identifier (DI-2) generated by said second instance of said unique personalized client application, installed at the standalone computing device.

9. The system as recited in claim 8, wherein said server includes a registration server or an authentication server or both.

10. The system as recited in claim 8, wherein registration at said server is initiated in response to submission of static credentials by said user to said server over the communication channel.

11. The system as recited in claim 8, wherein said first instance of said unique personalized client application is conveyed over the communication channel to said client terminal.

12. The system as recited in claim 8, wherein said first dynamic identifier (DI-1) is generated in response to submission of said static credentials to said server.

13. The system as recited in claim 8 wherein said second dynamic identifier (DI-2) is generated in response to submission of said static credentials to said second instance of said unique personalized client application.

14. The system as recited in claim 8, wherein said standalone computing device is selected from at least of a desktop computer system or a laptop computer system or a cellular telephone or a personal digital assistant (PDA) or a radio identification system (RFID) and a gadget capable of storing and processing data or combinations thereof.

15. The method as recited in claim 1, the standalone computing device is prevented from all network access.

16. The method as recited in claim 1, wherein authentication of said server by said user further comprises:
    entering by a manual intervention on the standalone computing device, the first dynamic identifier (DI-1) received at the client terminal.

17. The method as recited in claim 1, wherein authentication of said user by said server further comprises:
    entering by a manual intervention at the client terminal, the second dynamic identifier (DI-2) generated at the standalone computing device.

18. The system as recited in claim 8, wherein the standalone computing device is prevented from all network access.

19. The system as recited in claim 8, wherein the system is configured to achieve authentication of said server by said user by enabling manual input on the standalone computing device, of the first dynamic identifier (DI-1) received at the client terminal.

20. The systems as recited in claim 8, wherein the system is configured to achieve authentication of said user by said server by enabling manual input at the client terminal, of the second dynamic identifier (DI-2) generated at the standalone computing device.

* * * * *